United States Patent [19]

Aitcin et al.

[11] 3,956,003

[45] May 11, 1976

[54] SPHERICAL AGGREGATES

[75] Inventors: Pierre-Claude Aitcin, Sherbrooke; Claude Poulin, North Hatley, both of Canada

[73] Assignee: Universite de Sherbrooke, Canada

[22] Filed: June 19, 1974

[21] Appl. No.: 481,118

[52] U.S. Cl. .......................... 106/288 B; 106/40 V
[51] Int. Cl.$^2$ .......................................... C04B 33/00
[58] Field of Search ............... 106/288 B, 40 V, 309

[56] References Cited
UNITED STATES PATENTS

| | | | |
|---|---|---|---|
| 3,458,332 | 7/1969 | Alford et al. | 106/288 B |
| 3,666,506 | 5/1972 | Cowan, Jr. et al. | 106/40 V |

FOREIGN PATENTS OR APPLICATIONS

| | | | |
|---|---|---|---|
| 117,504 | 7/1918 | United Kingdom | 106/288 B |

*Primary Examiner*—Winston A. Douglas
*Assistant Examiner*—J. V. Howard
*Attorney, Agent, or Firm*—Cushman, Darby & Cushman

[57] ABSTRACT

A lightweight aggregate suitable for use in the manufacture of lightweight concrete, the lightweight aggregate being in the shape of hollow spheres, the outer surface of which is substantially rough and the inner surface of which is substantially vitrified, the wall being made of fired mineral or ceramic powder, the thickness of the wall being from 0.045 to 0.30 of an inch, the sphere being characterized by an outer diameter of ⅛ to 1½ inches and a saturated surface dried specific gravity of from 1.4 to 1.65.

3 Claims, No Drawings

SPHERICAL AGGREGATES

The present invention relates to novel lightweight hollow spheres which are particularly suitable as lightweight aggregate for mixing with cement to provide lightweight concrete having desirable structural and insulating properties.

PRIOR ART

It is known to manufacture lightweight, porous ceramic building materials such as building bricks, firebricks, refractory bricks and the like by incorporating therein minute spheres prepared by mixing organic materials such as sawdust, peatmoss, cork, coaldust, charcoaldust and the like with raw materials and as clay, slate, shale and mixtures thereof and after shaping the mixture, submitting same to firing thereby to cause combustion of the organic filler material thus providing a lightweight, porous ceramic building material.

It is also known to make lightweight ceramic products by incorporating an artificial resin filler as the organic material such as polystyrene foamed plastic in the shape of bubbles having a diameter of about 1.5 mm. Though suitable for making building materials, these procedures can be used in making lightweight aggregates useful in the preparation of insulating concrete. In this case the aggregate is used in the concrete.

It is also known to manufacture lightweight aggregates from various waste industrial materials for incorporation in construction materials as is disclosed in U.S. Pat. No. 3,030,222, Apr. 17, 1962, A.C. Eichenlaub, inventor.

It is also known to prepare cellular concrete products by incorporating into a concrete mixture a porosity wherein the cells are produced by expandable polystyrene in the form of small particles (40 to 60 mesh) and submitting the cast material to heat thereby causing the polymeric material to expand under the influence of heat during the curing. Such a procedure is disclosed in U.S. Pat. No. 3,021,291, Feb. 13, 1962, G. Thiessen, inventor.

It is proposed in accordance with the present invention to provide lightweight, hollow ceramic spheres suitable for incorporation in concrete as aggregate so that lightweight concrete structures can be prepared with a desirable structural strength.

THE INVENTION

The lightweight, hollow ceramic spheres of the present invention are characterized by having non porous walls made of fired mineral or ceramic powder, the thickness of the wall being from about 0.045 to about 0.30 of an inch, the diameter of the sphere being from about ⅛ to about 1 ½ inches and the saturated surface dried specific gravity $G_{ssd}$ of the sphere being from about 1.4 to 1.65. The strength of the spheres can be increased by increasing the thickness of the wall, but this will also increase the weight thus preventing any concrete incorporating such heavier spheres from being classified as lightweight structural concrete.

The lightweight, hollow ceramic sphere of the present invention are prepared by pelletizing powdered combustible organic material by procedures known in the art and then coating the thus obtained pellet with a powdered mineral or ceramic material. The pellets are formed by processing a humid preparation of the combustible organic material through a pelletizing disc or a rotating drum. The coated pellet are then fired in an oxidizing atmosphere whereby the organic material is completely burned and the gases formed therefrom are allowed to escape before the vitrification of the inner shell is formed.

As combustible organic material which can be used there may be mentioned powdered wood flour, peat moss, coal dust, charcoal dust, cork lignite, crushed bark, domestic organic debris, rubber dust, pulverized or powdered plastic waste or sewage sludge cake and similar organic materials. The organic combustible material should be in powdered form, preferably of a size which will pass a No. 50 sieve. When pelletizing the powdered organic material there is preferably added a wetting and binding agent such as lignosol and a fluxing agent such as soluble alkali metal or borosilicate in order to obtain total vitrification of the inside surface of the shell. The diameter of the pellets of combustible organic material generally vary between 0.080 to 1.25 of an inch.

As coating material there may be used any of the usual ceramic materials for example, alumina, clay, kaolin, shale or like argillaceous materials, mine tailings or a mixture thereof. The ceramic material used to coat the solid combustible organic pellets is applied in a pelletizer or a coating drum until a layer of from about 0.045 to about 0.30 of an inch has been deposited over the organic material pellet. The thus coated pellets are then fired in a rotating kiln identical to those used to expend shale or in a tunnel kiln as used to fire iron pellets. The firing operation is carried out for a period of time of from less than 1 hour to 5 hours, depending on the diameter of the pellets, and the type of kiln.

The present invention will be readily understood by referring to the following Examples which are given to illustrate the invention rather than limit its scope.

EXAMPLE I

1. Pellets 125 g of wood flour (sieve No. 100) are fed into a pelletizer and the speed is adjusted to 35 rpm while 275 cc of water containing 1% of lignosol were progressively sprayed over the powder. After operating the pelletizer for a period of 5 minutes, pellets varying in sizes of from 1/4 to 3/4 inch were obtained.

2. Coating of Pellets 400 g of pellets as obtained in Step 1 while still humid and having an average diameter of ⅜ inch are fed into a rotating pan along with 1100 g of powdered shale (sieve No. 50) and after operating the rotating pan for five minutes while spraying with a solution of lignosol solid spheres having a diameter of about ½ inch are obtained.

3. Firing

The solid spheres of Step 2 are then fired in an oven at a temperature of about 1145°C. (cone 2) while insuring a constant movement of air in the firing zone thereby eliminating any reducing gas formed during the distillation of the organic material forming the internal pellet or core of the sphere. The elimination of the reducing gases insures proper oxydation of the organic matter.

Similar results are obtained when the spheres obtained in Step 2 are first heated to 750°C. cooled and reheated to 1145°C.

The size of the spheres obtained average 3/4 inch in diameter and upon opening such spheres they are found to be hollow. The wall has an average thickness of about 0.18 inch.

The spheres thus obtained have a S.S.D. specific gravity of 1.5 to 1.6, a very low absorption of water less than 1% and a slightly irregular surface thus insuring improved bonding between the mortar cement paste, sand and aggregate. The spherical shape of the novel aggregates and their low water absorption are desirable properties not usually found in common lightweight concrete aggregates.

EXAMPLE II

By proceeding in the same manner as in Example I and starting with 42 gr of dried peat moss passing through sieve No. 50 and 150 cc of water containing 1% lignosol yielded corresponding pellets having a diameter of about ½ inch. The pellets were then coated with a mixture made up of 260 g of shale and 1040 g of asbestos tailings.

The thus coated pellets were then fired as in Example I at a temperature up to 2375°F. thus yielding spheres substantially similar to the spheres obtained in Example I.

EXAMPLE III

Describe incorporation of sphere in cement mix, physical properties of lightweight concrete thus obtained.

A lightweight concrete was prepared by mixing in a manner known in the art the following ingredients.

|  | lb. |
|---|---|
| water | 8.67 |
| cement | 19.17 |
| lightweight spherical aggregates | |
| ⅜" diameter | 11.78 |
| ⅝" diameter | 11.78 |
| ⅞" diameter | 11.76 |
| natural sand | 48.0 |

The water-cement ratio of this concrete was 0.45. The proportions needed to make one cubic yard of lightweight concrete incorporating the spheres of the present invention are as follows:

|  | lb. |
|---|---|
| water | 260 |
| cement | 575 |
| lightweight spherical aggregates | |
| ⅜" diameter | 355 |
| ⅝" diameter | 355 |
| ⅞" diameter | 350 |
| natural sand | 1340 |

The specific weight of the thus prepared fresh concrete is 120 lb./cu.ft. and its slump was 2 inches.

After curing the following results were obtained when compared with concrete incorporating Haydite as lightweight aggregates.

|  | days | compressive strength | lb/cu. ft. |
|---|---|---|---|
| (1) | 28 | 4600 psi | 113 |
| (2) | 28 | 4000 psi | 112 |

(1) aggregates of present invention
(2) using Haydite as aggregates.

EXAMPLE IV

Physical characteristics of spheres prepared in accordance with Example I and II are given in the following:

| Diameter (inches) | | Average Diameter | Water Absorption | S.S.D. Specific Gravity | Dry Rodded Specific Weight lb/cu.ft. |
|---|---|---|---|---|---|
| Organic Pellet | Fired Sphere | | | | |
| 0.087 to 0.375 | 0.25 to 0.5 | ⅜" | 3–5% | 1.55 to 1.65 | 57 |
| 0.374 to 0.500 | 0.5 to 0.75 | ⅝" | 3–5% | 1.55 to 1.65 | 54.2 |
| 0.500 to 0.750 | 0.625 to 1.00 | ⅞" | 3–5% | 1.55 to 1.65 | 54.5 |

The embodiments of the invention in which an exclusive property or privilege is claimed are defined as follows:

1. As a new product suitable for use as lightweight aggregate in the manufacture of lightweight concrete, the lightweight aggregate being in the shape of a hollow sphere, the outside surface of the wall being substantially rough and the inner surface of which is substantially vitrified, the wall being made of fired mineral or ceramic powder, the outer diameter of said sphere being ⅛ to 1½ inches, the thickness of the wall being from 0.045 to 0.30 of an inch, the sphere being also characterized by a saturated surface dried specific gravity of from 1.4 to 1.65.

2. A lightweight aggregate according to claim 1 wherein the thickness of the wall is from 0.08 to 0.30 of an inch.

3. A mixture of lightweight aggregates according to claim 2 having an average outer diameter of the sphere of about ⅛ inch, an average thickness of the wall of about 0.18 inch and having a saturated surface dried specific gravity of from 1.5 to 1.6.

\* \* \* \* \*